T. M. Kane,
Lifting Jack.
Nº 40,981. Patented Dec. 15, 1863.
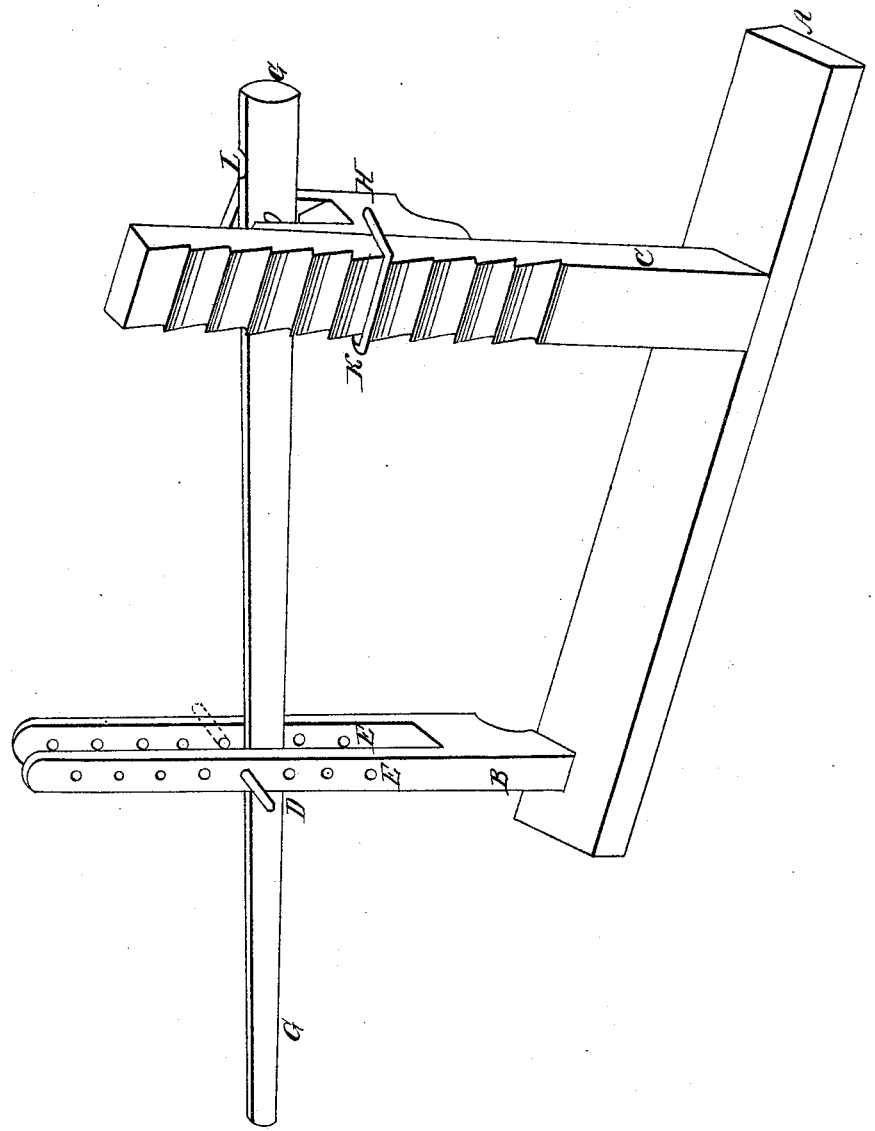
Witnesses,
J Franklin Reigart
Geo. F. Musser
Inventor,
Thomas McKane

UNITED STATES PATENT OFFICE.

THOMAS M. KANE, OF GOSHEN, NEW YORK, ASSIGNOR TO HIMSELF AND OGDEN HOWELL, OF SAME PLACE.

IMPROVEMENT IN LEVER-JACKS.

Specification forming part of Letters Patent No. 40,981, dated December 15, 1863.

*To all whom it may concern:*

Be it known that I, THOMAS M. KANE, of Goshen, in the county of Orange and State of New York, have invented new and useful Improvements in Lever-Jacks; and I do hereby declare that the following is a full and exact description thereof, reference being had to the accompanying drawings, and to the letters of reference marked thereon, making a part of this specification.

The nature of my invention consists in two uprights, one at each end of a bed-piece, with the lever operating on an adjustable block and clevis.

A represents the bed-piece, upon which is erected two upright bars, B and C. The upright B has a movable pin, D, which is inserted into the apertures E at any required height for the purpose of locking the lever G and holding it permanently to its place when the carriage or weight has been raised by the opposite end of lever G, the lever G operating in the fork of the upright B; C, the front upright, having a rack on its one side, and a movable block, H, on its opposite side. The front end of lever G rests in a fork of the block H, and operates on a pin, J, as its fulcrum, extending through the lever G and the sides of the block H. A clevis or adjustable link, K, is attached to the block H, and is for the purpose of being moved up and down to fit any tooth of the rack and hold the front end of lever to its place and the required height for raising. The front end of lever G, at the notch L, is placed under the axle of a carriage or wagon, and the block H, with its clevis K, is raised to the height required, the clevis K resting in one of the teeth of the rack. The opposite end of lever G is then pressed downward until the axle of the carriage is free from the ground, when the pin D is thrust through the apertures E, above the lever, of the fork or upright B, and the carriage is held permanently at the height required.

What I claim as my invention, and desire to secure by Letters Patent, is—

The construction of the uprights, in combination with the lever, block, and clevis, when constructed, arranged, and combined as herein described and for the purposes set forth.

THOMAS M. KANE.

Witnesses:
I. FRANKLIN REIGART,
DAN. ROWLAND.